(12) United States Patent
Inaoka

(10) Patent No.: US 8,276,702 B2
(45) Date of Patent: Oct. 2, 2012

(54) MOTORCYCLE

(75) Inventor: Hiroshi Inaoka, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 239 days.

(21) Appl. No.: 12/724,041

(22) Filed: Mar. 15, 2010

(65) Prior Publication Data

US 2010/0243360 A1   Sep. 30, 2010

(30) Foreign Application Priority Data

Mar. 26, 2009 (JP) ................... 2009-076071

(51) Int. Cl.
  *B62J 35/00* (2006.01)
(52) U.S. Cl. ....................................... 180/219
(58) Field of Classification Search .............. 180/219
  See application file for complete search history.

(56) References Cited

U.S. PATENT DOCUMENTS

| | | | | |
|---|---|---|---|---|
| 4,312,649 A * | 1/1982 | Fujii et al. | ........................ | 96/109 |
| 4,802,682 A * | 2/1989 | Yasuji | ........................ | 180/219 |
| 5,044,646 A * | 9/1991 | Iiga et al. | ........................ | 180/219 |
| 5,094,315 A * | 3/1992 | Taki et al. | ........................ | 180/219 |
| 5,542,706 A * | 8/1996 | Kubly | ........................ | 280/833 |
| 6,336,579 B1 * | 1/2002 | Sako | ........................ | 224/413 |
| 6,357,542 B1 * | 3/2002 | Sako | ........................ | 180/68.5 |
| 6,578,653 B2 * | 6/2003 | Nagai | ........................ | 180/230 |
| 6,591,934 B2 * | 7/2003 | Tsutsumikoshi | ........................ | 180/291 |
| 6,612,391 B2 * | 9/2003 | Yamauchi | ........................ | 180/292 |
| 2001/0007293 A1 * | 7/2001 | Yamauchi | ........................ | 180/219 |
| 2006/0102400 A1 * | 5/2006 | Okuno | ........................ | 180/68.4 |

FOREIGN PATENT DOCUMENTS

JP   4-353257 A   12/1992

* cited by examiner

*Primary Examiner* — Lesley D Morris
*Assistant Examiner* — Michael Stabley
(74) *Attorney, Agent, or Firm* — Westerman, Hattori, Daniels & Adrian, LLP

(57) ABSTRACT

A motorcycle is provided having an engine disposed on a vehicle body frame, a storage box disposed downward of a rider seat, a fuel tank for storing fuel to be supplied to the engine, and a canister for adsorbing fuel vapors generated in the fuel tank. The canister does not restrict the shape of the fuel tank, and the storage box and the fuel tank are disposed longitudinally. A storage box and a fuel tank are disposed in a longitudinally parallel arrangement. A rear cross frame forming part of a vehicle body frame and disposed between the storage box and the fuel tank connects rear frames which form part of the vehicle body frame and are disposed on both lateral sides of the storage box and the fuel tank. Further, a canister is disposed downwardly of the rear cross frame between the storage box and the fuel tank.

11 Claims, 4 Drawing Sheets

MOTORCYCLE

TECHNICAL FIELD

The present invention relates to a motorcycle having an engine disposed on a vehicle body frame so as to develop a drive power for driving a rear wheel, a storage box disposed downward of a rider seat, a fuel tank for storing fuel to be supplied to the engine, and a canister for adsorbing fuel vapors generated in the fuel tank.

BACKGROUND OF THE INVENTION

Japanese Patent Laid-open No. Hei 4-353257 discloses a scooter type motorcycle, in which a canister for adsorbing fuel vapors generated in a fuel tank is supported on a rear frame and is disposed rearward of a helmet storage box that is disposed downward of a rider seat.

SUMMARY OF THE INVENTION

When the storage box and the fuel tank are disposed downward of the rider seat in a longitudinally parallel arrangement, however, the canister may restrict the shape of the fuel tank depending on where the canister is disposed, resulting in an insufficient capacity of the fuel tank.

A motorcycle is provided that prevents the canister from restricting the shape of the fuel tank, while having the storage box and the fuel tank disposed longitudinally.

A motorcycle is disclosed that includes an engine disposed on a vehicle body frame so as to develop a drive power for driving a rear wheel; a storage box disposed downwardly of a rider seat; a fuel tank for storing fuel to be supplied to the engine; and a canister for adsorbing fuel vapors generated in the fuel tank. The motorcycle is firstly characterized in that the storage box and the fuel tank are disposed in a longitudinally parallel arrangement, with either one disposed forward of the other; a rear cross frame forms part of the vehicle body frame, is disposed between the storage box and the fuel tank and connects rear frames which form part of the vehicle body frame and are disposed on both lateral sides of the storage box and the fuel tank; and the canister is disposed downward of the rear cross frame between the storage box and the fuel tank.

Additionally, the motorcycle is characterized secondly in that the fuel tank includes a lower portion tank half body and an upper portion tank half body that are mutually connected together in such a manner as to form an outwardly bulging flange portion at a connection portion therebetween; and the rear cross frame is disposed downward of the flange portion.

Additionally, the motorcycle is characterized thirdly in that the canister is supported at a lower portion of the rear cross frame.

Additionally, the motorcycle is characterized fourthly in that the engine is disposed downward of at least one of the storage box and the fuel tank.

Additionally, the motorcycle is characterized fifthly in that the engine includes a crankcase and a cylinder that protrudes forwardly from the crankcase; and the crankcase has a front side upper portion swingably supported by the vehicle body frame.

According to the first characteristic of the motorcycle, the canister is disposed downward of the rear cross frame that is disposed between the longitudinally arranged storage box and fuel tank. This allows the canister to be disposed in a dead space without affecting the shape of the fuel tank.

According to the second characteristic of the motorcycle, the canister is disposed downward of the flange portion included in the fuel tank. This eliminates the need for setting a wide space between the storage box and the fuel tank for disposing the canister. The canister can therefore be disposed by making an efficient use of the space between the storage box and the fuel tank.

According to the third characteristic of the motorcycle, the canister is supported at the lower portion of the rear cross frame. This contributes to a reduction in weight by holding down an increase in the number of parts used.

According to the fourth characteristic of the motorcycle, the engine is disposed downward of at least one of the storage box and the fuel tank. This allows the length of a purging guide pipe connecting between the canister and the intake system of the engine to be shortened.

According to the fifth characteristic of the motorcycle, the purging guide pipe from the canister to the intake system of the engine can be routed along an area near the center of swing motion of the engine, thereby further shortening the length of the purging guide pipe.

BRIEF DESCRIPTION OF THE DRAWINGS

The advantages of the invention will become apparent in the following description taken in conjunction with the drawings, wherein.

DETAILED DESCRIPTION OF THE INVENTION

A specific embodiment to which the present invention is applied will be described below with reference to the accompanying drawings.

Figure 1:
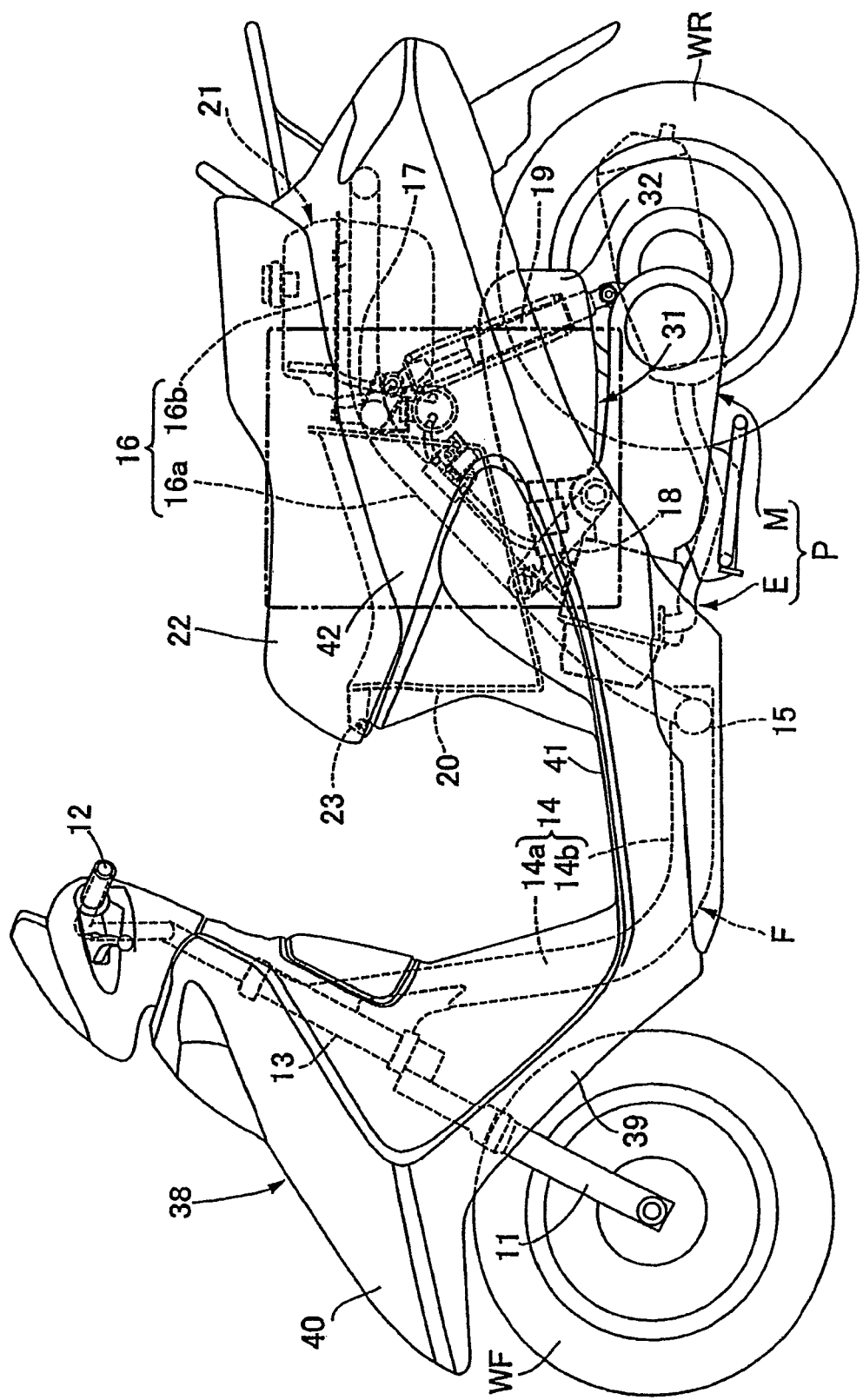
FIG. 1 is a left side elevational view showing a motorcycle.

A first embodiment of the present invention will be described with reference to FIGS. 1 through 4. Referring first to FIG. 1, a scooter type motorcycle includes a vehicle body frame F. The vehicle body frame F includes a head pipe 13, a down frame 14, a lower portion cross frame 15, a pair of left and right rear frames 16 and a rear cross frame 17. Specifically, the head pipe 13 steerably supports a front fork 11 that journals a front wheel WF and a steering handlebar 12 connected to the front fork 11. The down frame 14 integrates a first inclined portion 14a that extends downwardly toward the rear from the head pipe 13 with a first horizontal portion 14b that extends rearwardly from a lower end of the first inclined portion 14a. The lower portion cross frame 15 is fixedly attached to a rear end of the first horizontal portion 14b of the down frame 14 and extends laterally to left and right sides. Each of the left and right rear frames 16 integrates a second inclined portion 16a that has a front end connected to a corresponding lateral end portion of the lower portion cross frame 15 with a second horizontal portion 16b that extends rearwardly from an upper end of the second inclined portion 16a. The rear cross frame 17 connects the rear frames 16 together at a position corresponding to a connection portion between the second inclined portion 16a and the second horizontal portion 16b. Rear end portions of the rear frames 16, specifically, rear ends of the second horizontal portions 16b are opposed to each other.

A power unit P has a front portion vertically swingably supported at intermediate portions of the second inclined portions 16a in the rear frames 16 via a link 18. A rear wheel WR is journaled on a rear portion of the power unit P. The power unit P is formed to include an engine E and a continuously variable transmission M. Specifically, the engine E is disposed forward of the rear wheel WR. The continuously variable transmission M is disposed between the engine E and the rear wheel WR. In addition, a rear cushion unit 19 is disposed between the rear cross frame 17 and a rear portion of the power unit P.

Figure 2:
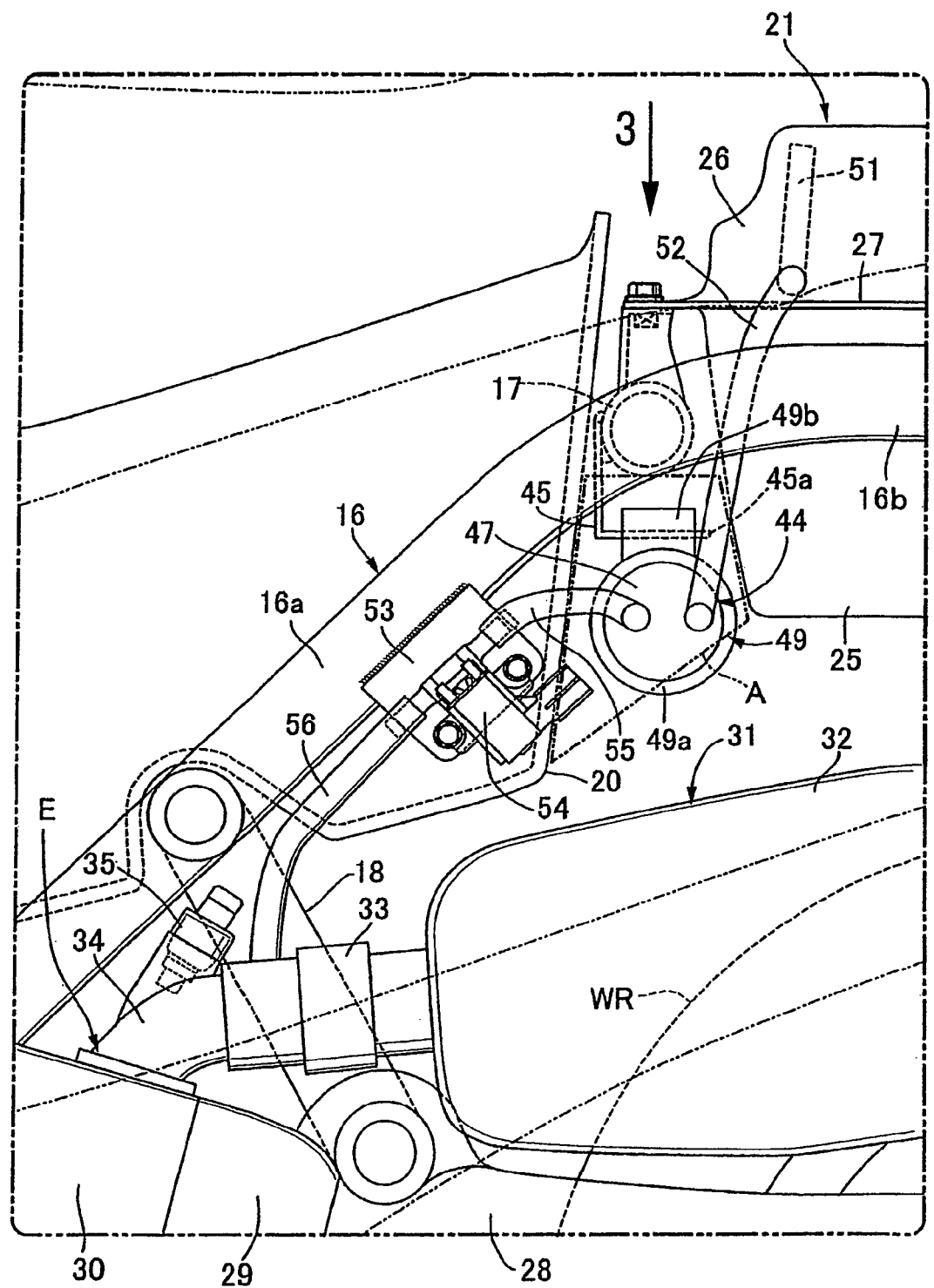
FIG. 2 is an enlarged side elevational view on arrow 2 of FIG. 1, with a vehicle body cover omitted.

Referring also to FIG. 2, a storage box 20 is disposed upwardly of the engine E so as to be supported on the rear frames 16 in the vehicle body frame F. The storage box 20 accommodates therein, for example, a helmet. The storage box 20 and a fuel tank 21 for storing fuel to be supplied to the engine E are disposed in a longitudinally parallel arrangement, with either one disposed forward of the other. In accordance with the first embodiment of the present invention, the storage box 20 is disposed forwardly of the fuel tank 21.

The storage box 20 and the fuel tank 21 are covered with a tandem type rider seat 22. The rider seat 22 has a front end connected to a front end upper portion of the storage box 20 via a hinge 23. Accordingly, the rider seat 22 is rotatably supported by the storage box 20 via the hinge 23 such that a rear portion of the rider seat 22 is rotatable upwardly. Rotating the rider seat 22 upwardly will open an upper end of the storage box 20. Additionally, the engine E is disposed downward of at least either one of the storage box 20 and the fuel tank 21; in accordance with the first embodiment of the present invention, the engine E is disposed downwardly of the storage box 20.

Figure 3:
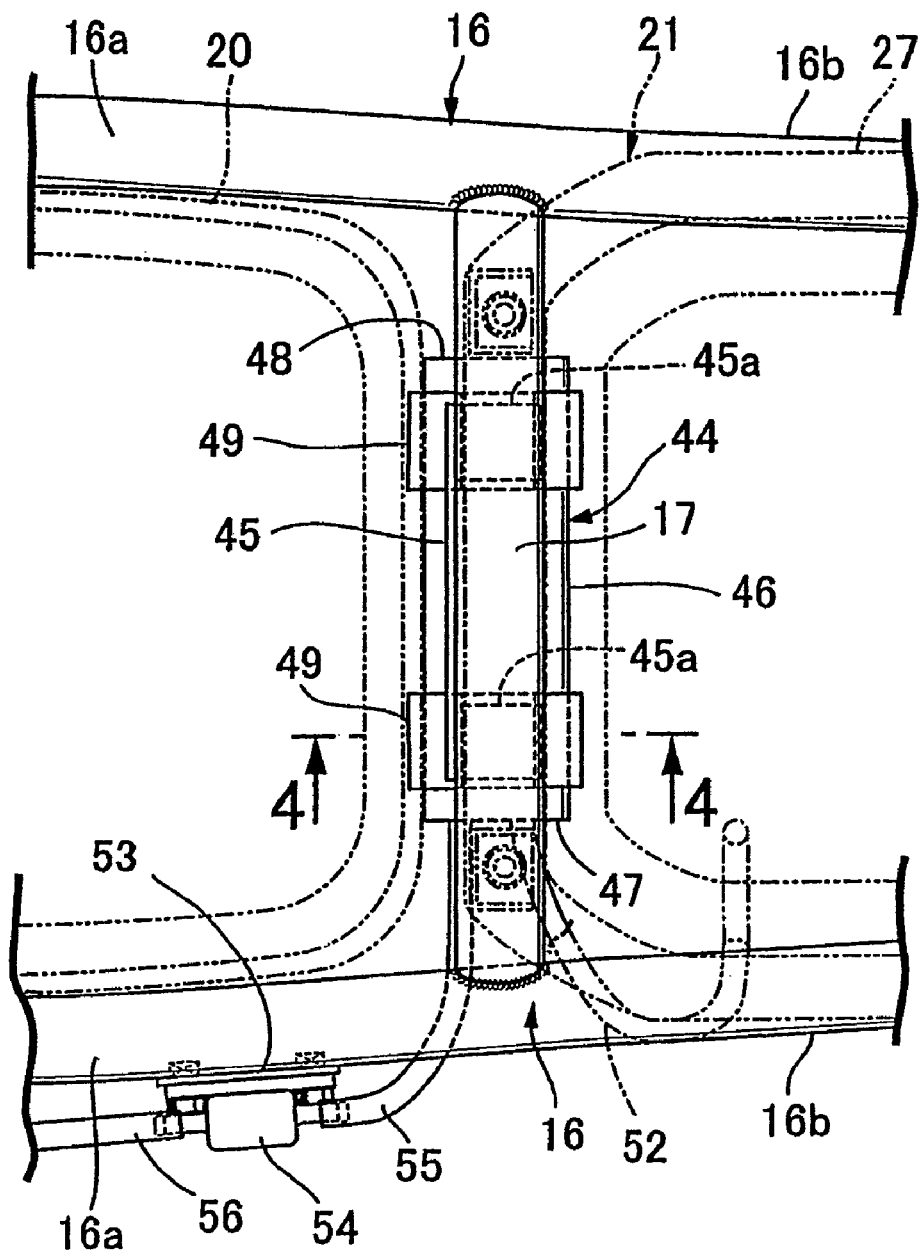
FIG. 3 is a view on arrow 3 of FIG. 2.

Referring also to FIG. 3, the left and right rear frames 16 forming part of the vehicle body frame F are disposed on respective lateral sides of the storage box 20 and the fuel tank 21. The rear cross frame 17 forming part of the vehicle body frame F to connect between the rear frames 16 is disposed between the storage box 20 and the fuel tank 21.

Additionally, the fuel tank 21 includes a lower portion tank half body 25 and an upper portion tank half body 26. Specifically, the lower portion tank half body 25 is an upwardly open bowl shape, while the upper portion tank half body 26 is a downwardly open bowl shape. The lower portion tank half body 25 and the upper portion tank half body 26 are mutually connected together in such a manner as to form an outwardly bulging flange portion 27 at a connection portion. The rear cross frame 17 mentioned earlier is disposed downward of the flange portion 27.

The engine E includes a crankcase 28, a cylinder 29 protruding forwardly from the crankcase 28, and a cylinder head 30 connected to the cylinder 29. The crankcase 28 has a front side upper portion swingably supported by the rear frames 16 of the vehicle body frame F via the link 18.

An intake system 31 is connected to an upper portion side wall of the cylinder head 30. The intake system 31 includes an air cleaner 32, a throttle body 33, and an intake pipe 34. The air cleaner 32 is disposed upwardly of the continuously variable transmission M. The throttle body 33 is connected to the air cleaner 32. The intake pipe 34 is disposed between the throttle body 33 and the cylinder head 30. The intake pipe 34 is fitted with a fuel injection valve 35.

Referring again to FIG. 1, part of the vehicle body frame F and the power unit P is covered with a vehicle body cover 38. The vehicle body cover 38 includes a front cover 40 made of a synthetic resin, a step floor 41, and a rear cover 42 made of a synthetic resin. Specifically, the front cover 40 includes a leg shield 39 that covers from a forward direction a leg portion of a rider sitting on the rider seat 22. The step floor 41 joins to a lower portion of the leg shield 39 so that the rider can rest his or her feet thereon. The rear cover 42 joins to the step floor 41 so as to cover part of the power unit P, the storage box 20, and the fuel tank 21 from sides. The rider seat 22 which is in a closed position by being hinge-supported by the storage box 20 is placed on the rear cover 42.

Fuel vapors generated in the fuel tank 21 are adsorbed by a canister 44. The canister 44 is disposed downward of the rear cross frame 17 between the storage box 20 and the fuel tank 21. Referring to FIG. 1, the canister 44 is disposed, in a side view, forward of the rear cushion unit 19 and upward of the intake system 31 connected to the upper portion side wall of the cylinder head 30.

Figure 4:
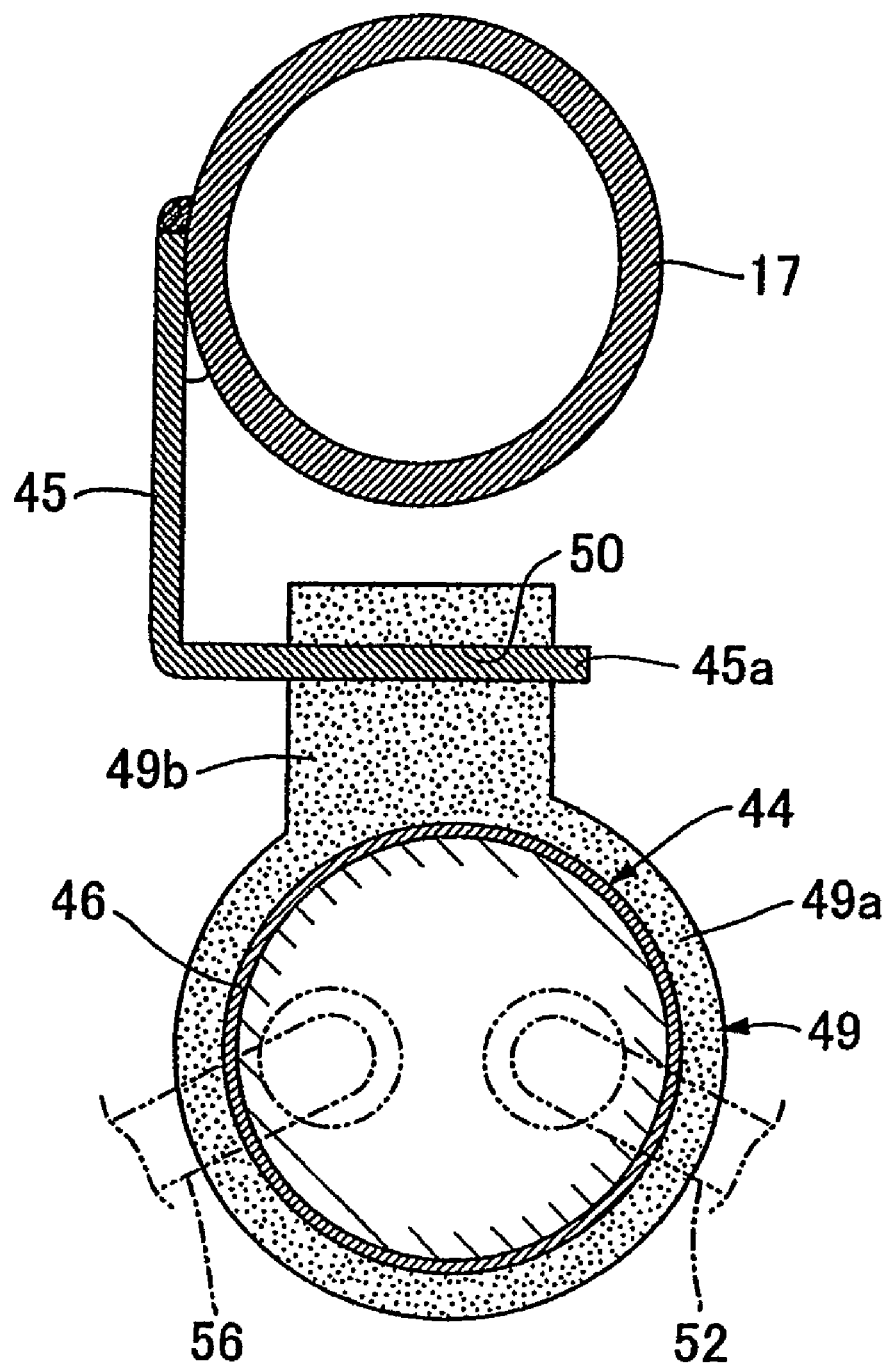
FIG. 4 is a cross-sectional view taken along line 4-4 of FIG. 3.

Referring also to FIG. 4, the canister 44 is supported via a stay 45 at a lower portion of the rear cross frame 17 such that at least part of the canister 44 is disposed in an area A defined by a rear wall of the storage box 20 and a front wall of the fuel tank 21 under the rear cross frame 17 in a side view. The stay 45 is fixedly attached to the lower portion of the rear cross frame 17 through, for example, welding.

A case 46 of the canister 44 is formed into a cylinder extending in a vehicle width direction and having both ends closed by end walls 47, 48. The case 46 of the canister 44 includes a pair of engagement members 49. The engagement members 49 are engaged with a pair of lock tabs 45a disposed on the stay 45, which results in the canister 44 being fixedly retained by the stay 45.

Each of the engagement members 49 is formed of an elastic material, for example, rubber, integrating an annular portion 49a and an engagement protrusion portion 49b protruding outwardly from the annular portion 49a. The annular portion 49a is resiliently mounted on an outer periphery of the case 46 in the canister 44. The engagement protrusion portion 49b includes an engagement hole 50 formed therein. A leading end portion of the lock tab 45a is passed through and engaged with the engagement hole 50.

The fuel tank 21 includes a charge pipe 51 made of metal having a first end open at an upper portion of the fuel tank 21. The charge pipe 51 is disposed so as to penetrate through a left side wall of the upper portion tank half body 26 in the fuel tank 21 and protrude to the left side. A charge hose 52 for deriving fuel vapors generated inside fuel tank 21 has a first end portion connected to a second end of the charge pipe 51. In addition, the charge hose 52 has a second end connected to the end wall 47 on the left-hand side of the two end walls 47, 48 of the case 46 in the canister 44. This allows the fuel vapors generated in the fuel tank 21 to be trapped by the canister 44.

Additionally, a stay 53 is fixedly attached to the second inclined portion 16a of the rear frame 16 on the left-hand side of the rear frames 16 of the vehicle body frame F. The stay 53 is disposed forward of the canister 44. The stay 53 is mounted with a purge control valve 54. The purge control valve 54 is solenoid valve that is closed when the engine E remains cold or during an idle operation and opens when the engine E is hot.

A first purge hose 55 for drawing fuel vapors trapped by the canister 44 has a first end portion connected to the end wall 47 on the left-hand side in the canister 44 and a second end portion connected to the purge control valve 54. Additionally, a second purge hose 56 has a first end portion connected to the purge control valve 54 and a second end portion connected to the intake pipe 34 in the intake system 31 of the engine E.

Accordingly, the fuel vapors trapped by the canister 44 are drawn from the canister 44 by negative pressure in the intake system 31 when the engine E is hot and supplied to the engine E from the intake pipe 34 of the intake system 31 via the first purge hose 55, the purge control valve 54, and the second purge hose 56.

A pressure release tube (not shown) for making the canister 44 open to the atmosphere and a drain tube (not shown) for discharging drain from the canister 44 are connected to the end wall 48 on the right-hand side of the two end walls 47, 48 of the case 46 in the canister 44.

Effects of the first embodiment will be described below. The storage box 20 and the fuel tank 21 are disposed in a longitudinally parallel arrangement, with either one (the storage box 20 according to the first embodiment of the present invention) disposed forward of the other. The rear cross frame 17 that forms part of the vehicle body frame F and is disposed between the storage box 20 and the fuel tank 21 connects between the rear frames 16 that form part of the vehicle body frame F and are disposed on both lateral sides of the storage box 20 and the fuel tank 21. Further, the canister 44 is disposed downward of the rear cross frame 17 between the storage box 20 and the fuel tank 21. This allows the canister 44 to be disposed in a dead space without affecting the shape of the fuel tank 21. Moreover, the canister 44 is supported at the lower portion of the rear cross frame 17, which contributes to reduction in weight by holding down an increase in the number of parts used.

The fuel tank 21 is formed to include the lower portion tank half body 25 and the upper portion tank half body 26 that are mutually connected together in such manner as to form the outwardly bulging flange portion 27 at the connection portion therebetween. Further, the rear cross frame 17 is disposed downwardly of the flange portion 27, so that the canister 44 is disposed downward of the flange portion 27 included in the fuel tank 21. This eliminates the need for setting a wide space between the storage box 20 and the fuel tank 21 for disposing the canister 44. The canister 44 can therefore be disposed by making an efficient use of the space between the storage box 20 and the fuel tank 21.

In addition, the storage box 20, and the lower portion tank half body 25 and the upper portion tank half body 26 constituting the fuel tank 21 are formed from molds and the storage box 20 and the fuel tank 21 are disposed such that a removal direction from the molds is vertical. As a result, due to a draft angle involved, the storage box 20 has a rear surface inclined downwardly toward the front and the lower portion tank half body 25 in the fuel tank 21 has a front surface inclined downwardly toward the rear. This results in the space formed between the storage box 20 and the lower portion tank half body 25 of the fuel tank 21 is wider at downward positions. This eliminates the need for setting a wide space between the storage box 20 and the fuel tank 21 for disposing the canister 44. The canister 44 can therefore be disposed by making an efficient use of the space between the storage box 20 and the fuel tank 21.

The engine E is disposed downward of at least either the storage box 20 or the fuel tank 21, or the storage box 20 according to the first embodiment. This allows the length of the first and second purge hoses 55, 56 connecting between the canister 44 and the intake system 31 of the engine E to be shortened.

Further, the engine E includes the crankcase 28 and the cylinder 29 that protrudes forwardly from the crankcase 28 and the crankcase 28 has a front side upper portion swingably supported by the vehicle body frame F. Accordingly, the second purge hose 56 of the purging guide pipes from the canister 44 to the intake system 31 of the engine E can be routed along an area near the center of swing motion of the engine E, thereby further shortening the length of the second purge hose 56.

While the present invention has been particularly shown and described with reference to a preferred embodiment, it should be understood that the present invention is not limited to the disclosed embodiment. It will be understood by those skilled in the art that various changes in form and detail may be made therein without departing from the spirit and scope of the invention.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

I claim:

1. A motorcycle, comprising:
   a vehicle body frame including rear frames and a rear cross frame connecting said rear frames;
   an engine disposed on said vehicle body frame;
   a rider seat;
   a storage box disposed downward of said rider seat;
   a fuel tank for storing fuel to be supplied to said engine; and
   a canister for adsorbing fuel vapors generated in said fuel tank,
   wherein said storage box and said fuel tank are disposed in a longitudinally parallel arrangement such that either (i) said storage box is disposed forward of said fuel tank, or (ii) said fuel tank is disposed forward of said storage box,
   wherein said storage box and said fuel tank are disposed on opposite sides of said cross frame forming part,
   wherein said storage box and said fuel tank are both disposed between said rear frames,
   wherein said canister is disposed downward of said rear cross frame and between said storage box and said fuel tank, said canister being fixed to said rear cross frame by a stay attached to said rear cross frame and a plurality of engagement members each surrounding said canister and being fixedly retained by said stay,
   wherein an axis of said canister is disposed in a direction parallel to said rear cross frame,
   wherein said fuel tank includes a lower portion tank half body and an upper portion tank half body, said lower portion tank half body and said upper portion tank half body being connected at an outwardly bulging flange portion, and
   wherein said outwardly bulging flange portion is disposed upward of said rear cross frame.

2. The motorcycle according to claim 1, wherein said canister is supported below said rear cross frame.

3. The motorcycle according to claim 2, wherein said engine is disposed downward of at least one of said storage box and said fuel tank.

4. The motorcycle according to claim 3,
   wherein said engine includes a crankcase and a cylinder that protrudes forwardly from said crankcase; and
   wherein a front side upper portion of said crankcase is swingably supported by said vehicle body frame.

5. The motorcycle according to claim 1, wherein said engine is disposed downward of at least one of said storage box and said fuel tank.

6. The motorcycle according to claim 5,
   wherein said engine includes a crankcase and a cylinder that protrudes forwardly from said crankcase; and
   wherein a front side upper portion of said crankcase is swingably supported by said vehicle body frame.

7. The motorcycle according to claim 1, further comprising a purge control valve fixedly attached to an inclined portion of one of said rear frames.

8. The motorcycle according to claim 7, wherein said purge control valve is disposed forward of said canister.

9. The motorcycle according to claim 1, wherein said stay is fixed to a lower portion of said rear cross frame.

10. The motorcycle according to claim 1, wherein said engagement members are engaged with lock tabs on said stay.

11. The motorcycle according to claim 1, wherein said engagement members are formed of an elastic material.

* * * * *